United States Patent
Tsatsanis

(10) Patent No.: US 7,471,732 B2
(45) Date of Patent: Dec. 30, 2008

(54) METHOD AND APPARATUS FOR TRAINING USING VARIABLE TRANSMIT SIGNAL POWER LEVELS

(75) Inventor: Michail Konstantinos Tsatsanis, Huntington Beach, CA (US)

(73) Assignee: Aktino, Inc., Irvine, CA (US)

( * ) Notice: Subject to any disclaimer, the term of this patent is extended or adjusted under 35 U.S.C. 154(b) by 865 days.

(21) Appl. No.: 10/913,285

(22) Filed: Aug. 6, 2004

(65) Prior Publication Data
US 2006/0029147 A1    Feb. 9, 2006

(51) Int. Cl.
*H04B 7/02*    (2006.01)
*H04K 1/10*    (2006.01)

(52) U.S. Cl. .................................. 375/267; 375/260

(58) Field of Classification Search .............. 375/267, 375/260, 257, 347, 346, 349; 370/203, 298
See application file for complete search history.

(56) References Cited

U.S. PATENT DOCUMENTS

| | | | |
|---|---|---|---|
| 5,285,474 A | 2/1994 | Chow et al. | |
| 5,479,447 A | 12/1995 | Chow et al. | |
| 5,673,290 A | 9/1997 | Cioffi | |
| 5,887,032 A | 3/1999 | Cioffi | |
| 6,252,901 B1 | 6/2001 | Mueller et al. | |
| 6,345,071 B1 | 2/2002 | Hamdi | |
| 6,353,636 B1 * | 3/2002 | Tate et al. | 375/260 |
| 6,520,744 B1 | 2/2003 | Verbin et al. | |
| 6,567,464 B2 | 5/2003 | Hamdi | |
| 6,587,502 B1 | 7/2003 | Hendrichs et al. | |
| 6,711,207 B1 | 3/2004 | Amrany et al. | |
| 6,870,882 B1 * | 3/2005 | Al-Dhahir et al. | 375/233 |
| 2001/0027392 A1 * | 10/2001 | Wiese, Jr. | 704/230 |
| 2001/0048667 A1 | 12/2001 | Hamdi | |
| 2002/0111156 A1 * | 8/2002 | Roeder | 455/417 |
| 2003/0026282 A1 | 2/2003 | Gross et al. | |

(Continued)

FOREIGN PATENT DOCUMENTS

WO    WO 03/105339    12/2003

(Continued)

OTHER PUBLICATIONS

Eric W. Weisstein, "Eric Weisstein's World of Mathematics—Diagonal Matrix", © 1999 CRC Press LLC, © 1999-2003 *Wolfram Research, Inc.*, 2 pages.

(Continued)

*Primary Examiner*—Khai Tran
(74) *Attorney, Agent, or Firm*—Weide & Miller, Ltd.

(57) ABSTRACT

A method and apparatus for a multiple channel communication device training, and processing utilizing a transmit signal power control operation. Multiple channel communication devices utilize inter-channel crosstalk mitigation techniques, such as MIMO processing modules or MIMO precoding systems, to cancel unwanted crosstalk coupling across active and provisioned channels. Upon provisioning and activation of a new channel that connects to the multiple channel communication device the signal on the new channel couples into other channels and the existing MIMO filtering or processing structure is untrained to mitigate the crosstalk from the new channel. A power control training operation prevents crosstalk from hindering operation on other channels during the training operation. During one example training operation, the power level of a transmit signal is incrementally increased as the crosstalk cancellation filter(s) are trained.

23 Claims, 13 Drawing Sheets

U.S. PATENT DOCUMENTS

| | | | |
|---|---|---|---|
| 2003/0081759 | A1 | 5/2003 | Harris |
| 2003/0086362 | A1 | 5/2003 | Hasegawa et al. |
| 2003/0123487 | A1 | 7/2003 | Blackwell et al. |
| 2004/0085987 | A1 | 5/2004 | Gross et al. |
| 2004/0105465 | A1 | 6/2004 | Gross et al. |
| 2004/0223511 | A1 | 11/2004 | Tzannes |

FOREIGN PATENT DOCUMENTS

| | | |
|---|---|---|
| WO | WO 03/105352 | 12/2003 |

OTHER PUBLICATIONS

Steffen Trautmann, et al., "A New Equalizer for Multitone Systems Without Guard Time", *IEEE Communications Letters,* vol. 6, No. 1, Jan. 2002, pp. 34-36.

Jeffrey Wu, et al., "Efficient Matrix Multiplication Methods to Implement a Near-optimum Channel Shortening Method for DMT Transceivers", The University o Texas at Austin, Asilomar Conference, Oct. 30, 2000, 14 pages.

J. Cioffi, "Digital Duplexing: VDSL Performance Improvement by Aversion of Frequency Guard Bands (TD13)", ETSI TM6 Endinburgh, Sep. 20-24, 1999, pp. 1-16.

Lei Wang, et al., "Low-Power AEC-Based MIMO Signal Processing for Gigabit Ethernet 1000Base-T Transceivers", Copyright 2001, ACM 1-58113-371-5/01/0008, pp. 334-339.

Arthur Redfern, et al., "Expanding the Reach of ADSL", http://www.commsdesign.com/story.OEG20030717S0028, Jul. 17, 2003, 2 pages.

\* cited by examiner

METHOD AND APPARATUS FOR TRAINING USING VARIABLE TRANSMIT SIGNAL POWER LEVELS

FIELD OF THE INVENTION

The invention relates to communication systems and in particular to a method and apparatus for power control during a communication device training process.

RELATED ART

There exists a continuing demand in the communication field for data communication systems that achieve higher effective data transfer rates. To meet these demands, certain communication systems employ advanced processing techniques to perform filtering, equalization, and other processing on a signal, either prior to or after transmission.

One type of advanced signal processing technique comprises multiple input, multiple output (MIMO) processing. One environment that may benefit from a MIMO processing system is a point to multi-point communication system. An example environment of use of a point to multi-point communication system is illustrated in FIG. 1. As shown, a central office 104 or any other location may be configured with communication equipment 116. Multiple communication lines 112 terminate at the central office 104, as such, the termination location for the multiple lines is referred to as a point location. From this point location, the communication channels extend to multiple different remote communication devices. These remote communication devices are referred to as the multi-point locations.

As stated, the communication lines 112 fan out to various remote locations, which may comprise businesses, homes, curbside communication terminals, or any other termination point, which may be referred to generally herein as termination at CPE (customer premise equipment). In contrast to a point location, the remote termination points are referred to as a multi-point location because instead of the lines terminating at a single point, there are multiple different and separate termination points. One example environment where a point to multi-point configuration may be used is when provisioning DSL service to a home or business.

A MIMO processing apparatus is capable of utilizing information regarding the signals on each of the lines, or the signals themselves, at a point location to generate cancellation signals that are tailored to cancel crosstalk or other unwanted noise that couples into each of the signals arriving at the point location. Based on the received signal on each line, the MIMO processing is capable of generating cancellation signals tailored to each of the other lines to thereby remove unwanted noise and crosstalk from each incoming signal. As a result of the MIMO processing, the lines may be configured to operate at higher effective data rates and over longer distances, as compared to systems that do not utilize MIMO processing. It is contemplated that absent the benefits of MIMO processing, the lines would be unable to support communication at the implemented effective data transmit rate and over the distances provisioned due to unacceptably high levels of crosstalk or noise.

One drawback of such a configuration is that it is unlikely that all of the lines serviced by communication device 116 are sold to customers, i.e. activated, at the same time. In general, new lines, i.e. channels, are activated when new subscribers sign contracts and provide payment for communication service. As a result, new lines are activated over time or when needed. In addition, some channels may drop out of service until re-sold or re-provisioned.

When a channel is activated, it generates crosstalk that couples into the other lines that are already in service. This crosstalk disrupts the signal on the other lines. While normally such disruption could be mitigated or cancelled in the MIMO processing unit, in the case of activating a new line, the MIMO processing unit is not trained to mitigate or cancel this new source of crosstalk. As a result, the activation of a new line can bring down, i.e. crash, communication service on the other previously provisioned and currently in operation communication lines. This occurs because crosstalk from the signal on the newly activated channel couples into the other channels and the MIMO processing unit is not configured to mitigate or cancel the crosstalk from the signal on the newly active channel. The same phenomenon may occur when an active line is in a low power mode (e.g., when idling) and abruptly enters a full power mode.

As can be appreciated, this is a highly undesirable event due to customer complaints, lost data, inconvenience, and potential lost profit for the service provider. As a result, there is a need in the art for a method and apparatus to provision a new line to insure that such activation does not interfere with operational lines to a degree sufficient to hinder operation of the operational lines. This operational issue, if left unresolved, is severe enough to outweigh all other benefits and block the use of MIMO technologies in point-to-multipoint communication networks.

SUMMARY

To overcome the drawbacks of the prior art, a method for canceling crosstalk type coupling in a multi-channel communication system is disclosed. In one embodiment, this method comprises initiating signal transmission at a first power level on a channel being provisioned during a training process, wherein one or more other channels associated with the multi-channel communication device are already provisioned. The method then detects one or more coupling components on the one or more other channels and processing the one or more coupling components to generate one or more filter coefficients. The filter coefficients are used to configure one or more filters. In this method transmitting at the first power level does not disrupt operation of the one or more other channels and the one or more filters are configured to generate cancellation signals to cancel the one or more coupling components. As the filters become trained, the power level of the transmitted signal may be increased.

In one embodiment, this method further comprises transmitting a training signal on the channel being provisioned at a second power level such that the second power level is greater than the first power level and signals transmitted at the second power level are processed based on the filter coefficients generated as a result of the signal at the first power level. It is also contemplated that this method may further comprise detecting and processing one or more coupling components on at least one of the one or more channels based on the signal transmitted at the second power level and then modifying at least one filter coefficient. The step of configuring one or more filters may comprise configuring at least one precoder filter and/or at least one receiver filter.

Also disclosed herein is a method for training a new channel in a multi-channel communication device when other channels associated with multi-channel communication device are already provisioned comprising the steps of transmitting a training signal over the new channel at a first power level such that the first power level is lower than a power level used during normal communication on the channel, such as for data. This method then processes one or more received signals received over the new channel, the already provisioned channels or both to determine one or more coupling cancellation values. The coupling cancellation values are used to configure one or more coupling cancellation devices, such as, for example, filters and then increasing the power level for subsequent transmitted signals on the new channel.

In one embodiment, the coupling cancellation devices comprise a receiver based MIMO processing module, a transmitter based precoder MIMO processing module, or both. It is contemplated that the processing module comprises one or more filters. The training signal may be transmitted from a remote multi-point location to a point location and coupling information may be transmitted from the remote multi-point location to the point location. This method may also comprise transmitting a training signal at a second power level, which is greater than the first power level.

A system is disclosed for training one or more filters in a multi-channel communication device during provisioning of a channel when other channels associated with the multi-channel communication device are already provisioned and operational. One embodiment of this system may comprise a control device configured to control transmit power of a training signal and a transmitter, responsive to the control device, configured to transmit one or more training signals at a first power level, such that the first power level is less than a power level utilized on a provisioned channel. Also part of this system is a receiver configured to receive the training signal and at least one signal on a provisioned channel. Part of the receiver is a MIMO processing module that is configured to establish one or more coefficients and process one or more received signals utilizing the one or more coefficients to cancel unwanted coupling from the newly active channel to the already provisioned and active channel.

In one embodiment, the MIMO processing module comprises at least one filter and at least one junction configured to combine a cancellation signal with a received signal. The step of establishing one or more coefficients occurs when a channel, whether being provisioned or already provisioned, initiates communication. In one embodiment, the control device is in communication with the transmitter to thereby control transmit power level. It is contemplated that the transmitter may be configured to transmit training signals at two or more different power levels each of which is less than the power level utilized on the provisioned and active channels. Thus, in one embodiment, for each of the power levels, the MIMO processing module is configured to update the one or more coefficients.

In one embodiment, a system is provided for performing MIMO processing during training of a first channel without disrupting communication on a second channel. This system comprises a transmitter configured to transmit on the first channel a first training signal at a first power level and a second training signal at a second power level. In this embodiment, the first power level is less than the second power level. A receiver configured to receive the first training signal on the first channel and the second signal on the second channel may be part of this system and the receiver may have a MIMO processing module configurable to cancel coupling from the first training signal and the second training signal transmitted on the first channel to the second signal on a second channel. The MIMO module may comprise at least one filter having one or more coefficients configured to generate at least one cancellation signal such that the coefficients are established in stages responsive to the different power levels of the first training signal and the second training signal. The MIMO module may also have at least one junction configured to combine at least one cancellation signal with the second signal to cancel coupling.

This embodiment may further comprise a MIMO preceding system configured to generate one or more cancellation signals. In addition, it is contemplated that the power level of the first training signal does not disrupt operation of the second channel. Furthermore, the second training signal when transmitted at the power level of the second training signal does not disrupt operation due to cancellation of crosstalk by the at least one cancellation signal.

Also disclosed herein is a method for establishing or updating filter coefficients in a MIMO precode filter during activation of a new channel. In one embodiment, this method comprises sending a training alert signal from a CO transmitter to one or more CPE receivers associated with active channels and then transmitting a training signal from the CO transmitter to a CPE receiver associated with the channel being activated. Thereafter, the method monitors, with one or more CPE receivers associated with active channels, for noise, coupling or both generated by transmission of the training signal and isolates noise, coupling, or both generated by the training signal and received at the CPE receivers associated with active channels. The noise, coupling, or both or information regarding the noise, coupling, or both may be transmitted from the CPE associated with the active channels to the CO and processed to establish MIMO precode filter coefficients configured to pre-cancel noise, coupling, or both resulting from signals on the channel being activated.

In one embodiment, the CO transmitter has access to channels 1 through N+1 and a CPE has access to only one channel thereby preventing MIMO processing at the one or more CPEs. The step of isolating noise, coupling, or both may be performed by a processor. As described herein, the method may repeat utilizing a training signal that is at a power level generally similar to the power level of a signal on an active channel to thereby establish the MIMO precode filters coefficients in stages to reduce the chances of disrupting operation of an active channel.

Also disclosed is a method for activating a channel in a point to multi-point communication system comprising the steps of monitoring for coupling from a training signal at one or more CPE locations and detecting coupling onto one or more active channels at one or more CPEs associated with active channels. The method may then transmit coupling information to a CO and modifying one or more precode MIMO filter coefficients based on the coupling information.

In one variation, this method further comprises transmitting a training alert signal from the CO to one or more CPE locations associated with an active channel to initiate the monitoring. In one embodiment, the training signal is transmitted at least once at a power level that is less than a power associated with a signal transmitted on an active channel. In addition, the precode MIMO filter may comprise a filter, having one or more coefficients, located in the CO transmitter and configured to process one or more outgoing signals to pre-cancel crosstalk during operation of the communication. Furthermore, the training signal may be transmitted from the CPE location to the CO or from the CO to a CPE location and the training signal may comprise a known training signal or active data on a channel undergoing activation.

A method for activating a channel in a point to multi-point communication system is also disclosed. One such method comprises transmitting a training signal alert from a CO to one or more active CPEs associated with active channels and transmitting a training signal or data on a channel being activated. The method steps also include receiving coupling information from one or more CPEs associated with active channels, wherein the coupling information comprises information regarding coupling from the training signal or data that couples into the active channels from the channel being activated. Process of the coupling information to generate one or more filter coefficients occurs to establish a precode MIMO filter with the one or more filter coefficients. In this method, transmitting a training signal may occur multiple times to allow multiple opportunities for the CPE to detect the coupling from the training signal.

To enable operation of these methods, a communication device configured to communicate with two or more CPEs as part of a point to multi-point communication system and configured to perform precode MIMO filtering on outgoing signals transmitted from a point location to multiple remote locations is also disclosed. In one embodiment, this device comprises at least one transmitter configured to transmit a training signal to a CPE associated with a channel being activated and a receiver configured to receive coupling information from one or more CPEs associated with an active channel. As part of this system is a precode MIMO filter configured to generate or receive one or more new filter coefficients based on the coupling information and process one or more outgoing signals with the one or more new filter coefficients such that the new filter coefficients also account for coupling from the channel being activated.

In this system, the transmitter may be further configured to transmit a training alert signal to one or more CPEs. The training signal may be transmitted at a power level that is less than the power level utilized on an active channel to reduce the chance of the training signal disrupting operation of an active channel. Either the filter or a processor may be configured to calculate the one or more new filter coefficients.

Other systems, methods, features and advantages of the invention will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
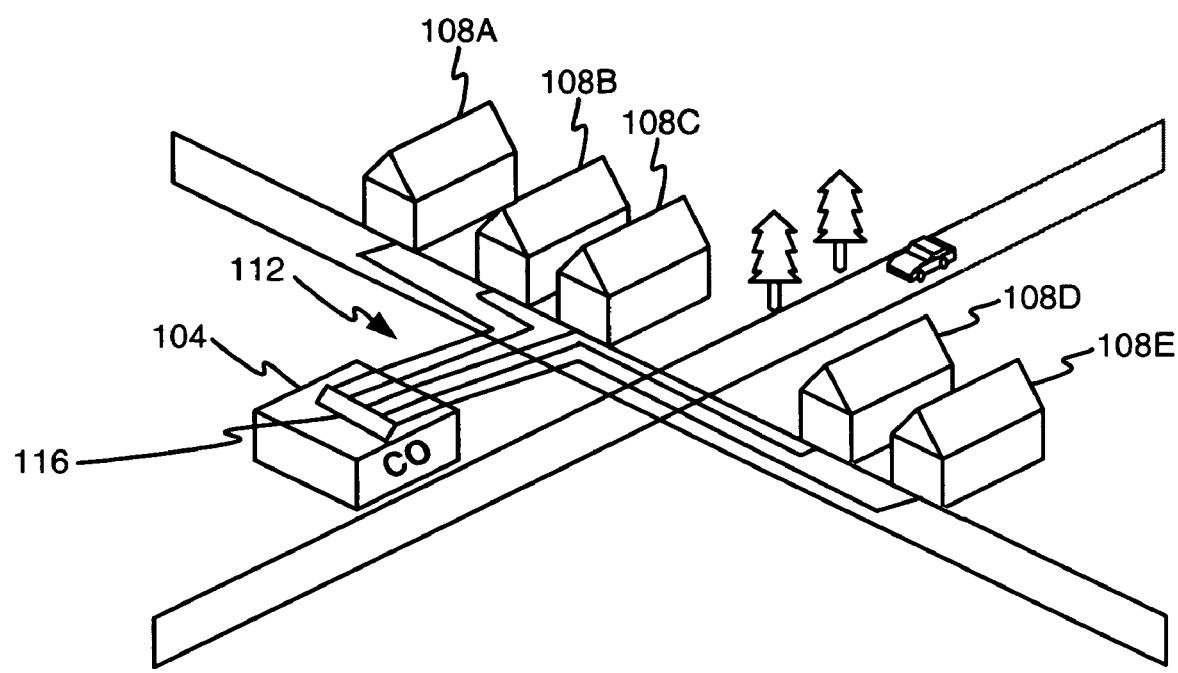
FIG. 1 illustrates an example environment of use of the invention.
Figure 2:
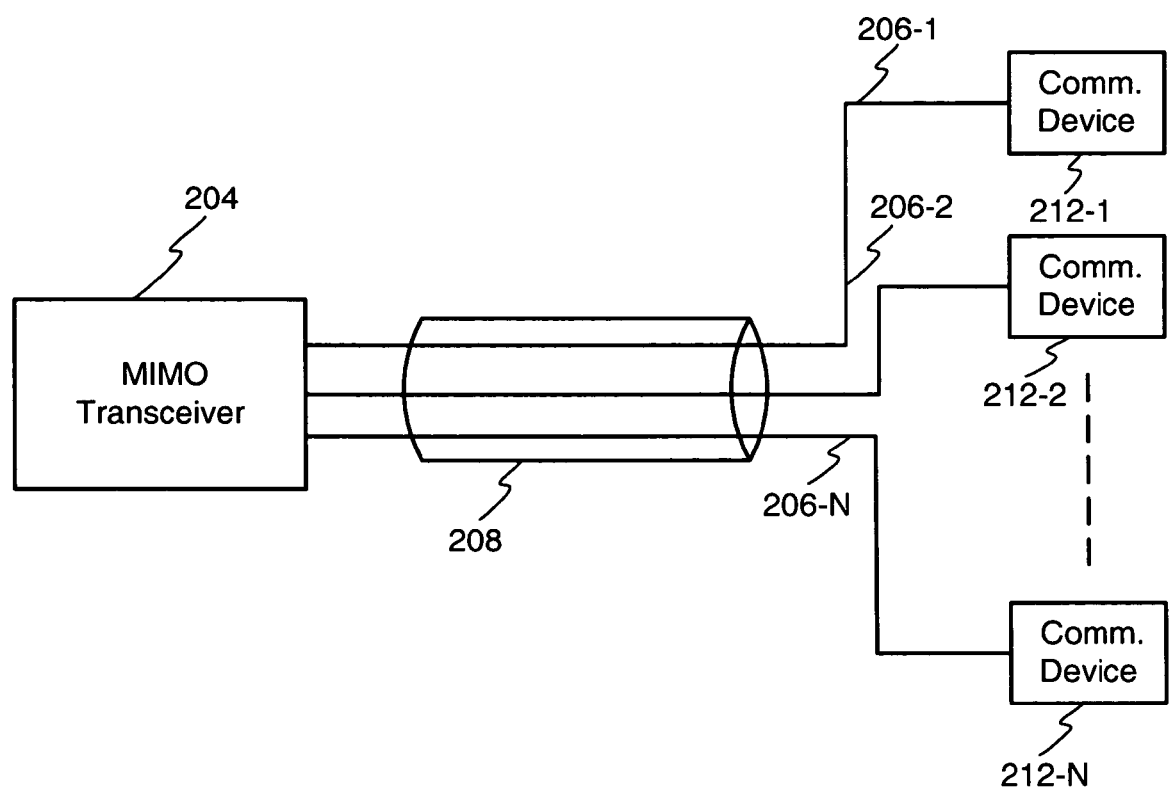
FIG. 2 illustrates a block diagram of an example point to multi-point communication system with MIMO processing.

FIG. 2 illustrates an example embodiment of a point to multi-point communication system. As shown, a transceiver 204 is configured with MIMO processing capability at a point location. Two or more channels 206-1 through 206-N extend from the transceiver 204 to one or more remote communication devices 212-1, 212-2, ..., 212-N. N may comprise any positive integer. It is contemplated that each of the remote communication device 212-1, 212-2, ..., 212-N are located at different locations or that each communication device 212 does not have electrical access to the other communication devices 212 to perform MIMO type crosstalk cancellation.

It is further contemplated that within at least a portion of the runs of the channels 206, the channels are in sufficiently close proximity that crosstalk coupling develops between the channels. These sections of close proximity are shown by section 208. The MIMO processing, such as performed by communication device 204, which is discussed below in more detail, is configured to mitigate this crosstalk generated by the active channels.

Figure 3:
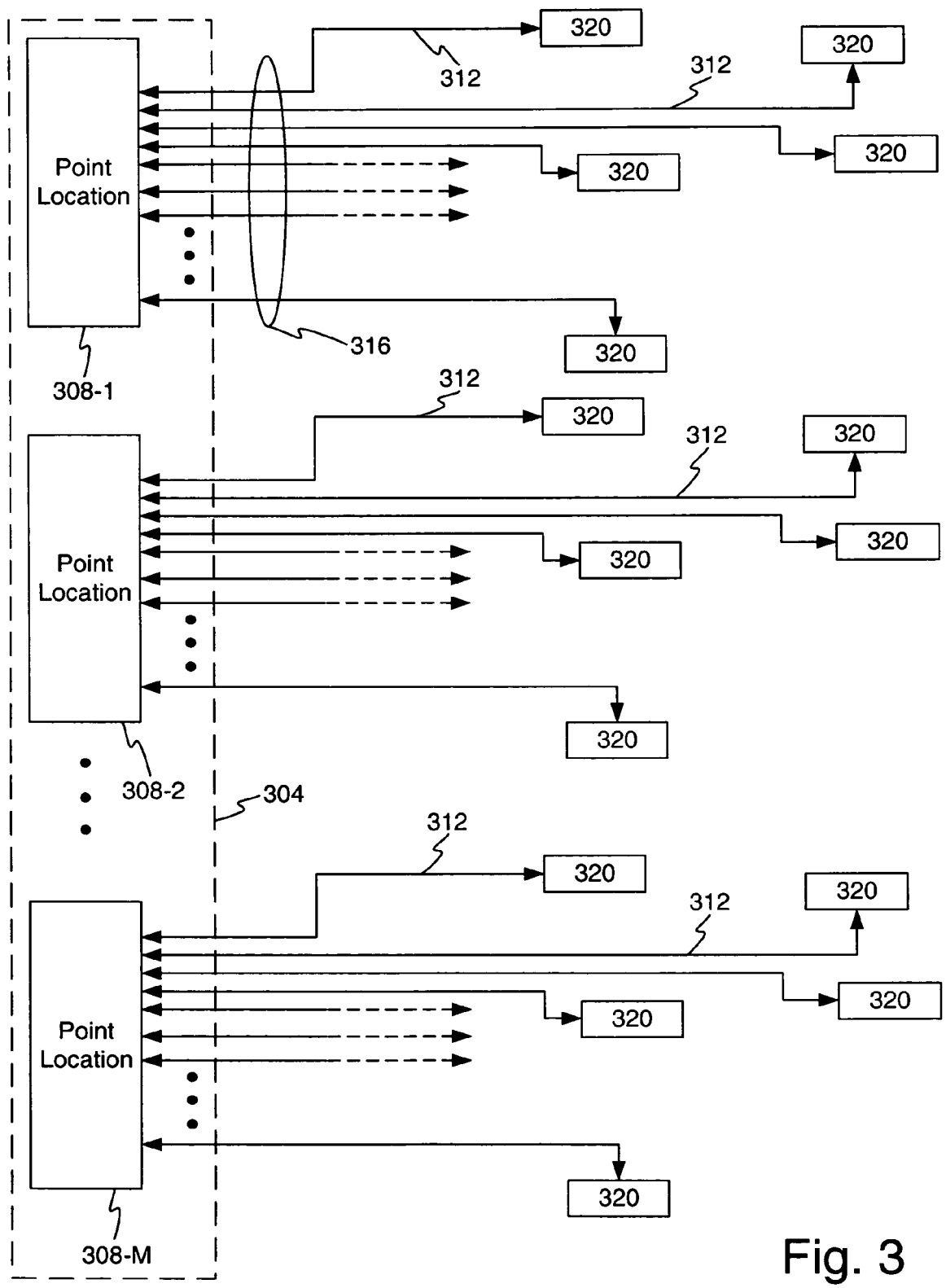
FIG. 3 illustrates a block diagram of an example multi-system point to multi-point communication system with MIMO processing.

FIG. 3 illustrates a block diagram of a system configured with multiple (numerous) point to multi-point communication systems. As shown, a first location 304 comprises one through M communication devices defined herein as point locations. In this embodiment, the point locations 308-1, 308-2, ..., 308-M are configured with and utilize some form of interchannel crosstalk mitigation, such as MIMO processing. One or more channels 312 connect the point locations 304 to one or more remote communication devices 320, which may be referred to as multi-point locations.

For at least a portion 316 of the distance between termination points of the channels 312, the channels are in close proximity thereby allowing crosstalk to couple between channels. The MIMO or other cross channel type processing at the point locations 308 is configured to mitigate the crosstalk thereby allowing communication to occur in a crosstalk rich environment, or allowing for higher data transmit rates, lower error rates, or both than would otherwise be possible. As a result, it is contemplated that absent such MIMO or other cross channel type processing, the active channels could not support data communication at the specified rate and distance.

Figure 4:
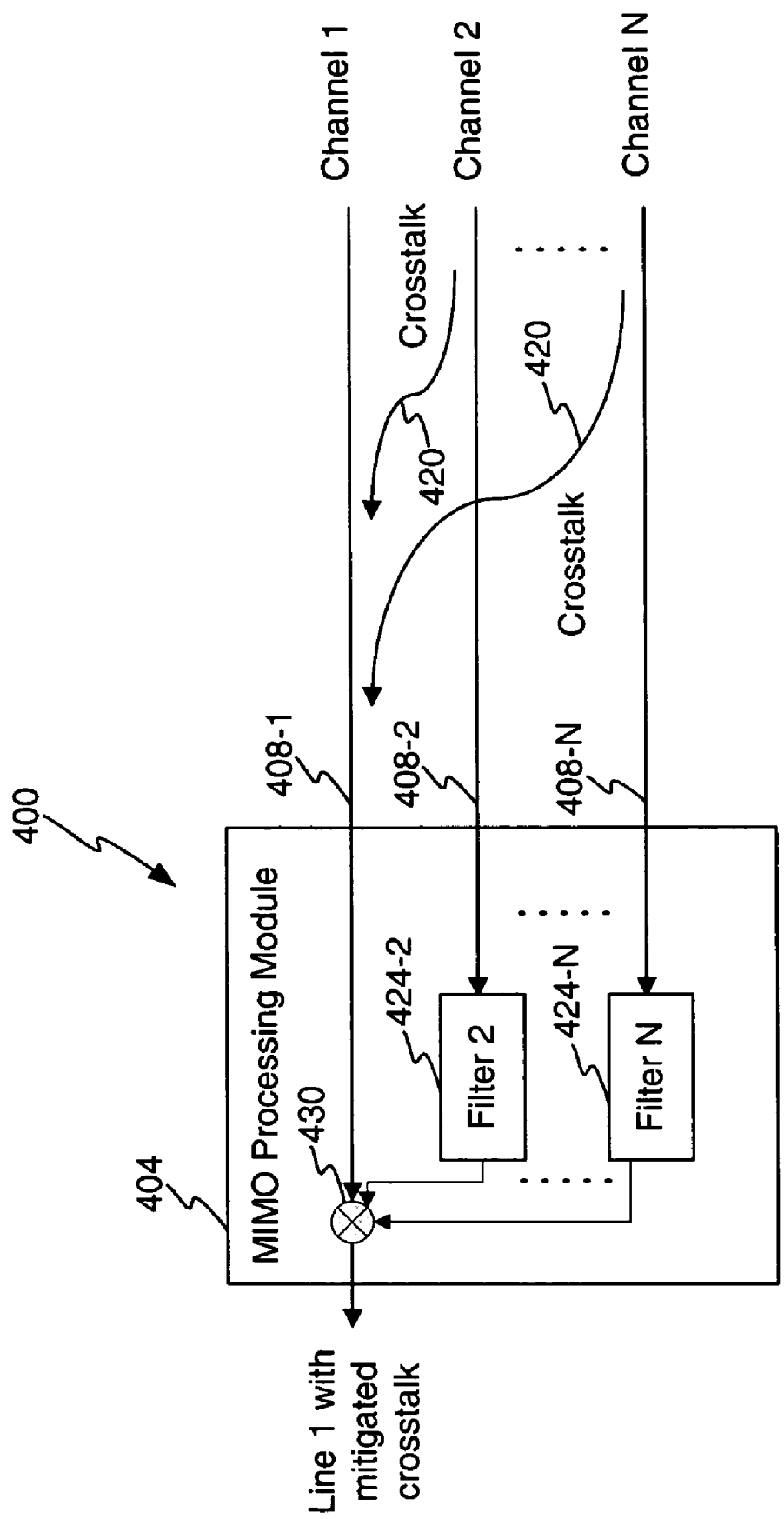
FIG. 4 illustrates a block diagram of a point location with crosstalk coupling and MIMO crosstalk cancellation for N users.

FIG. 4 illustrates a block diagram of one possible embodiment of a point location with crosstalk coupling. As shown, a point location 400 comprises a MIMO processing module 404 configured to receive two or more signals over two or more channels 408-1, 408-2, ..., 408-N. As shown, the channels 408 are in sufficiently close proximity to allow cross-coupling 420 between channels. It is contemplated that at least one of the channels 408 has an opposing end that is connected, i.e. terminated, in this embodiment to an active or provisioned remote communication device (not shown) and that the remote communication device is not in sufficiently close proximity to other remote communication devices to allow for MIMO or multi-channel cancellation on the remote side.

Turning now to the exemplary embodiment of the MIMO processing module 404, filters 424-2, 424-N are associated with each channel 408. The filters 424 are configured to generate a cancellation signal tailored to cancel, from a victim channel, the crosstalk that couples into the victim channel. In the embodiment shown in FIG. 4, channel 1 is the victim channel and hence, the filters are configured to cancel coupling from each respective channel, with which the filters 424 are associated, into the victim channel 408-1. The filters 424 generate a cancellation signal that is provided to a junction 430, such as, for example, a summing junction or a subtractor 430, that is configured to combine the victim signal received on channel 1 with the cancellation signals from the filters 424. The output of the junction 430 comprises the victim signal absent some or all of the unwanted crosstalk from active channels selected from the group of channels 2 through channel N. It is contemplated that these filters 424 utilized one or more filter coefficients or other values which are generated or arrived at after a training process. There are numerous prior art training processes that may be utilized to generate these filter coefficients for the filters associated with provisioned or active channels.

The term provisioned channel is defined to mean a channel that is configured for, installed, trained up and capable of use, such as by a customer. In some embodiments, whether a provisioned channel is or is not active (in the sense of transmitting useful data) is not important to this discussion because it is common practice for all provisioned transceivers to transmit signals at all times, even when idle. Hence from the perspective of crosstalk interactions, in some embodiments, we can use the terms provisioned and active interchangeably.

A channel may undergo training as part of the provisioning process. It is contemplated that the embodiment of FIG. 4 may further comprise one or more channels, which are not provisioned and hence, also not active. For example, there may be channels N+1, N+2, . . . (not shown), which may not be provisioned and/or active. The non-provisioned channels are not transmitting, and hence, these channels do not generate crosstalk. As a result, the filters 424 of the MIMO processing module 404 are not and cannot be trained to cancel such non-existent crosstalk. It is further contemplated that a structure, similar to that shown by filters 424 and junction 430, which are configured to cancel crosstalk on victim channel 1, may also be duplicated and associated with each of the other channels so that all of the provisioned channels realize the benefits of the MIMO processing.

The terms inactive or not provisioned in this disclosure should be understood to also include operational lines that have either been switched off or operate in a low power mode with a minimal data rate for a period of time, typically for the purpose of power conservation. The problem of increased crosstalk is also present when such a line re-enters a full power mode.

It should be noted that the embodiment of FIG. 4 describes one out of many possible MIMO crosstalk cancellation architectures. For simplicity and clarity of presentation, a linear filtering architecture is shown. The disclosed invention is also applicable to different MIMO architectures including decision feedback filtering or other non-linear processing methods.

Figure 5:
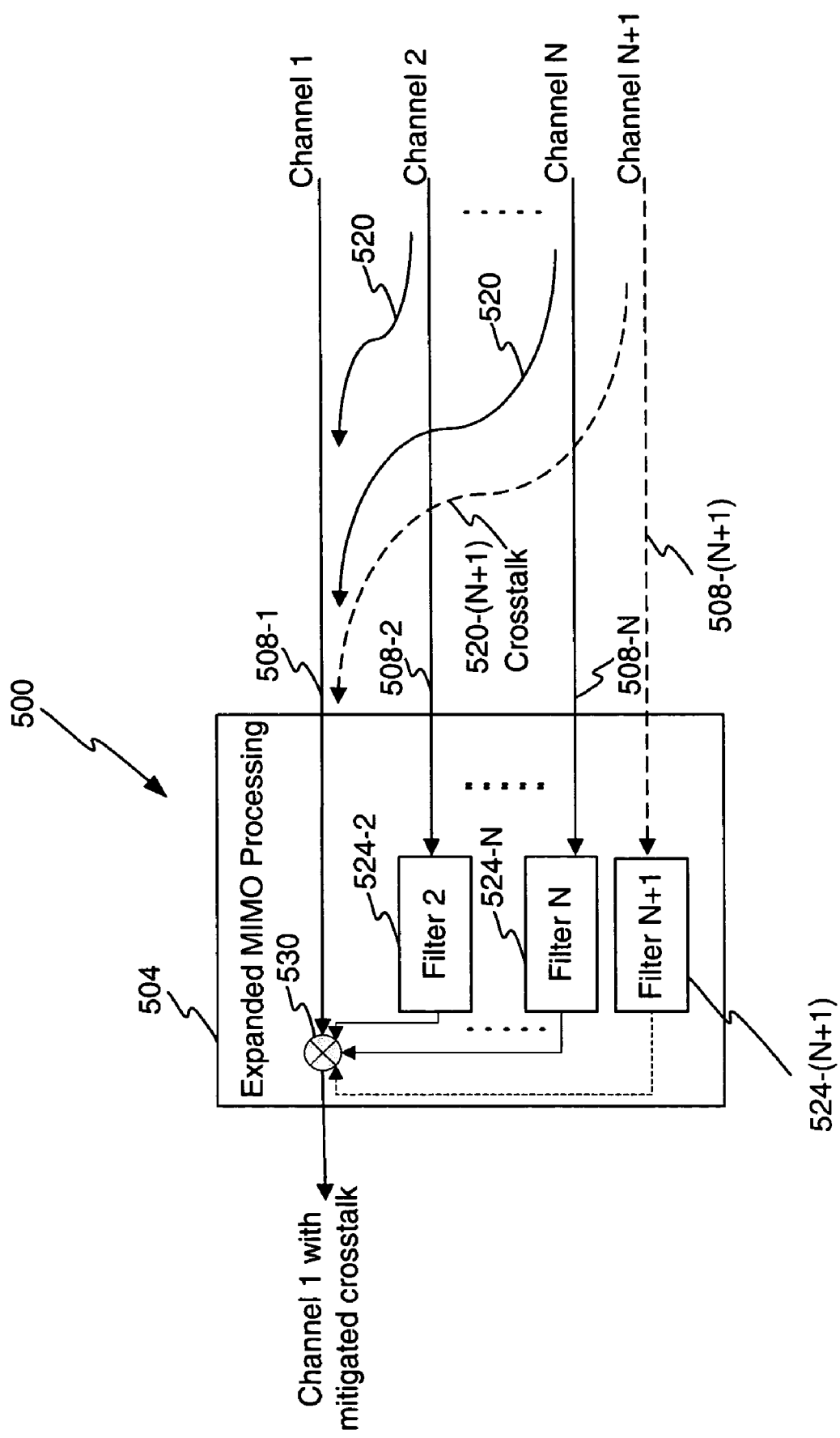
FIG. 5 illustrates the block diagram of FIG. 4, with the addition of a newly provisioned and active channel N+1.

FIG. 5 illustrates the block diagram of FIG. 4, with the addition of a newly provisioned and active channel N+1. As compared to FIG. 4, identical elements are identified with identical reference numbers. New provisioning of a channel N+1 results in active communication, i.e. signal transfer, over channel N+1. In turn, such active communication generates crosstalk component 520-(N+1) that couples into the victim channel 1 and all other channels, which also become victim channels to this disturber coupling from the new channel N+1. This coupling component is significant enough to disrupt operation of the other channels because at start-up the filter 524-(N+1) associated with channel N+1 is not active, trained, or otherwise configured to generate a cancellation signal, that would be provided to the junction 530, to cancel the unwanted coupling.

Because, however, the filter structure 404 is not capable, at start-up, to cancel this unwanted coupling from newly provisioned and active channel N+1, communication over the one or more other channels that are in sufficiently close proximity to the new channel N+1 may fail (crash), which is to say, the communication session will terminate and a re-initialization process must occur. This may occur during active communication or training of the filters for the new channel. Regardless, it is highly undesirable.

This occurs because it is highly likely that one or more of the other channels will be sufficiently close to the newly activated channel for crosstalk to couple from the new active channel to the previously provisioned channel. It is contemplated that until training and desired operation of the filter 524-(N+1) (for channel N+1), communication on channel 1 will be in jeopardy, or operate at a data rate that is below capability or specification. The filter 524-(N+1) is not configured, at activation of the channel 508-(N+1), to cancel the coupling because it has not been trained to the particular coupling environment and coupling relation between channel N+1 and channel 1. These principles apply to all of the other channels, onto which the signal on channel N+1 will couple. Thus, operation of channel N+1 without adequate filtering to generate cancellation signals will likewise affect the other channels.

As a result, provisioning and activation of a new channel, such as for example channel N+1, will result in crosstalk coupling that the MIMO processing module 504 is unable to cancel due to the untrained and un-active status of the filters associated with the new channel in the module 504.

To overcome these drawbacks and provide reliable and consistent communication when provisioning new channels in a point to multi-point communication system, the method and apparatus described herein utilizes a transmit power control system and method for controlling transmit power during training. During the initial stages of training, the new channel, which is being provisioned or starting active communication, initiates the training utilizing a signal at a lower power level, or lower than is used in prior art systems. It is contemplated that such a low power training signal may be used for training during the provisioning of the line to initiate an active communication session. Use of a low power signal reduces coupling into other active channels thereby reducing or eliminating the coupling effect from the signals on the channel undergoing training to the other active channels.

In one embodiment, during a training operation, the filters configured to channel crosstalk generated by the newly provisioned channel are trained with the low power signal. One or more training stages or phases may be provided, each utilizing training signals with sequentially increasing power levels. In this manner, the filters are trained in one or more stages, using signals having power levels that are matched to the degree or proficiency of filter training. It is contemplated that by matching the training signal's power level to filter training progress, the filters are progressively trained to generate cancellation signals. By starting with a low power training signal, the amount of crosstalk coupling may be reduced (due to the lower power signal), yet training may still occur. The crosstalk cancellation may be performed, due to the partially trained filter, to a sufficient degree to not interfere with communication on the other active channels. Over time, the power level of the training signal may be increased while concurrently, the filter training yields cancellation signals that cancel crosstalk commensurate with the increasing power level of the transmitted signal.

Figure 6:
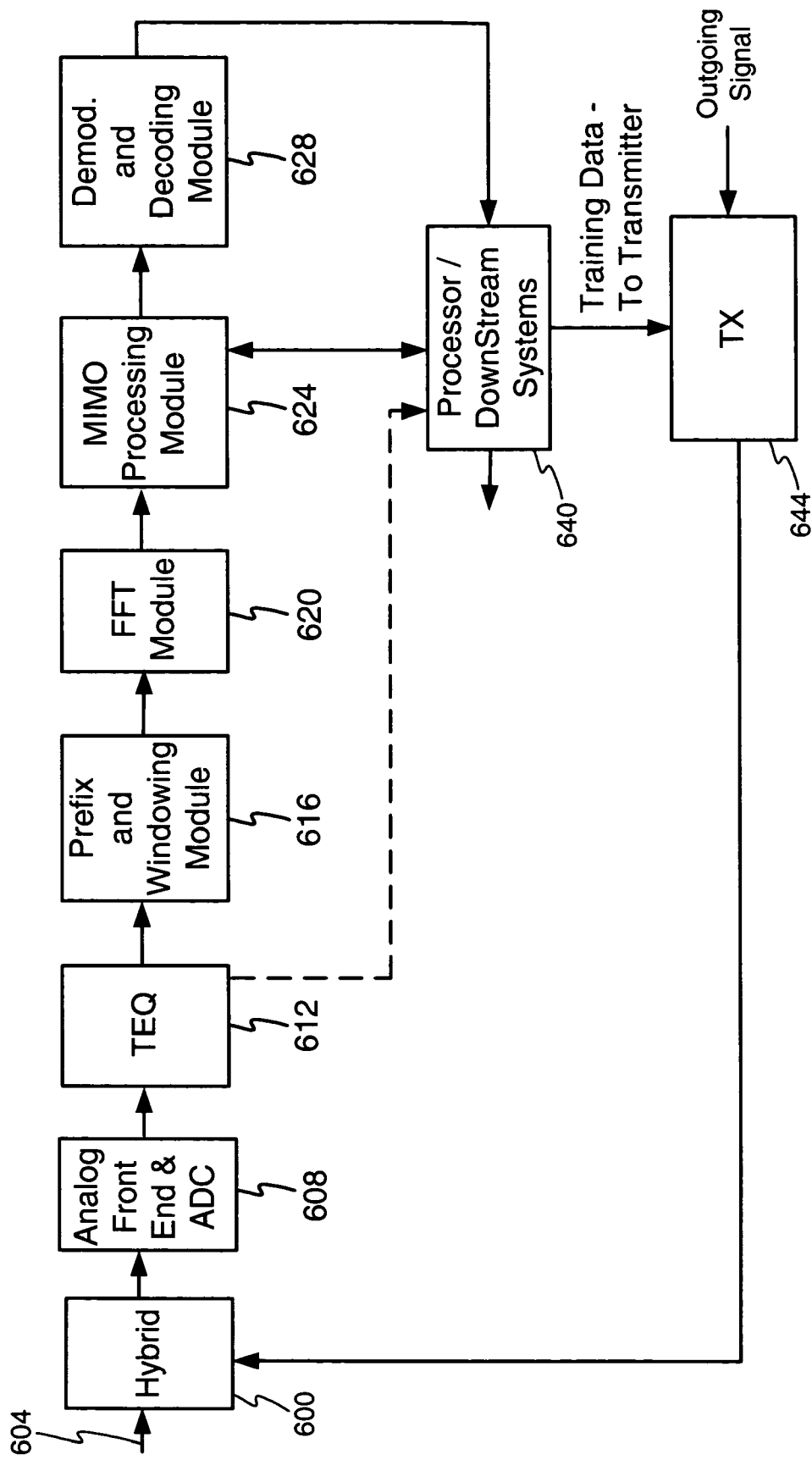
FIG. 6 illustrates a block diagram of a transceiver at a multi-point location.

FIG. 6 illustrates a block diagram of a transceiver at a multi-point location. This is but one possible example embodiment and, as such, it is provided for purposes of discussion and to aid in understanding of the invention. It is contemplated that one of ordinary skill in the art may arrive at a different embodiment, or that the invention may be applied to different environments, without departing from the scope of the claims. This example embodiment is in a DMT transceiver architecture environment.

As shown, a hybrid 600 connects to a channel to isolate incoming from outgoing signals. The channel 604 is configured to receive an input signal from a transmission medium or one or more intermediate devices that may reside between the transmission medium, such as a channel, and the input, such as a transformer or other device. The channel may comprise two or more channels. As it is contemplated that the transceiver of FIG. 6 be utilized in a multi-channel environment, the channel 604 may comprise a parallel line comprising numerous conductors or channels. Similarly, the devices shown in FIG. 6 and throughout this document may consist of one or more such devices as may be necessary to meet the processing requirements described herein. These devices may be interconnected by one or more channels, such as in a parallel configuration. Thus, in the case of FIG. 6, if the channel 604 were to comprise twelve channels, then the ADC block 608 may comprise twelve individual ADC devices.

The channel 604 provides one or more received signals to a hybrid 600. The hybrid isolates and separates the received signal from the outgoing signal. The output of the hybrid 600 connects to one or more analog to digital converters (ADC) 608 that convert the one or more incoming signals to a digital format for subsequent processing. The ADC 608 may be part of an analog front end. Thereafter, one or more optional time domain equalizers (TEQ) 612 may receive and process the one or more signals to reduce or negate the effects of transmission of the signal through the one or more channels. Any type equalization may occur.

After equalization, one or more prefix and windowing modules 616 perform an optional windowing and/or prefixing operation on the one or more signals as would be understood by one of ordinary skill in the art. After the optional windowing operation, one or more FFT modules 620 perform a Fourier Transform on the one or more signals. Any type Fourier Transform may occur including a Fast Fourier Transform operation. The FFT module 620 output(s) are provided to a multiple input, multiple output (MIMO) processing module 624 that is configured to receive the multiple inputs of the multi-channel input to the receiver and perform processing as is described below in greater detail. In the embodiment described therein, MIMO processing module performs processing on two or more signals to account for the affects of the channel and coupling that may have occurred during transmission. MIMO processing is described below in more detail. The processing that occurs prior to the MIMO processing module may be referred to herein as receiver pre-processing or simply pre-processing. This is discussed below in more detail.

The output of the MIMO processing module 624 is provided to a de-modulation and decoding module 628 that is configured to de-modulate and decode the one or more received outputs from the MIMO processing module. In one embodiment, the demodulation and decoding module 628 reverses the modulation and encoding performed by the transmitter if such was performed. In one embodiment, this comprises QAM type modulation and encoding. It is also contemplated that error correcting coding type modulation may occur. In one embodiment, Trellis Coded Modulation may be used. In another embodiment, turbo coding or other coding schemes may be employed.

The output of the demodulation and decoding module 628 connects to a processor or downstream system 640, which in turn connects to a transmitter 644. The processor or downstream system 640 may also optionally communicate with the TEQ 612 and/or the MIMO processing module 624. An output from the processor or downstream system 640 may provide data to other devices. The processor or downstream system 640 may comprise hardware, software, or a combination of both.

In one embodiment, the processor or downstream system 640 is configured to control one or more aspects of operation of the transceiver shown in FIG. 6. It is contemplated that the processor or downstream system 640 may be configured to control one or more of the transmit power levels, training operation, filter coefficient calculation and establishment, and reception of communication from the remote locations that comprise the multi-point locations. In addition, it is contemplated that the transmitter may communicate data, training information, control data, or any other type data to the communication devices located at the remote point locations. In this manner, the training power levels and filter coefficient levels may be controlled. The processor or downstream system 640 may also control operation of the communication device at the remote multi-point locations.

In one embodiment, the output of the FFT module 620 comprises a total of 256 tones on each of fourteen channels or lines for each block, symbol, or register transfer. It is contemplated that the MIMO block 624 may jointly process all of the fourteen channels for each of the 256 tones. Thus, processing may occur on one frequency at a time (fourteen channels) as the system cycles through the 256 frequencies, which represent the data. In various different embodiments, a different number of channels may be used to provide the requested or desired bandwidth, i.e. data exchange capacity. Although any number of channels may be used, the range of six to fourteen channels may be selected in many applications.

It is contemplated that a receiver structure similar to that shown in FIG. 6 may be provided at each multi-point location, however, without the MIMO processing module 624. As can be appreciated, MIMO processing or other inter-channel cancellation may not occur because at certain remote locations that comprise the multi-point location only a single channel terminates and thus, access to the signals on the other channels may not be had. To avoid un-necessary repetition, a duplicate structure is not shown and described for each of the multiple channels.

Figure 7:
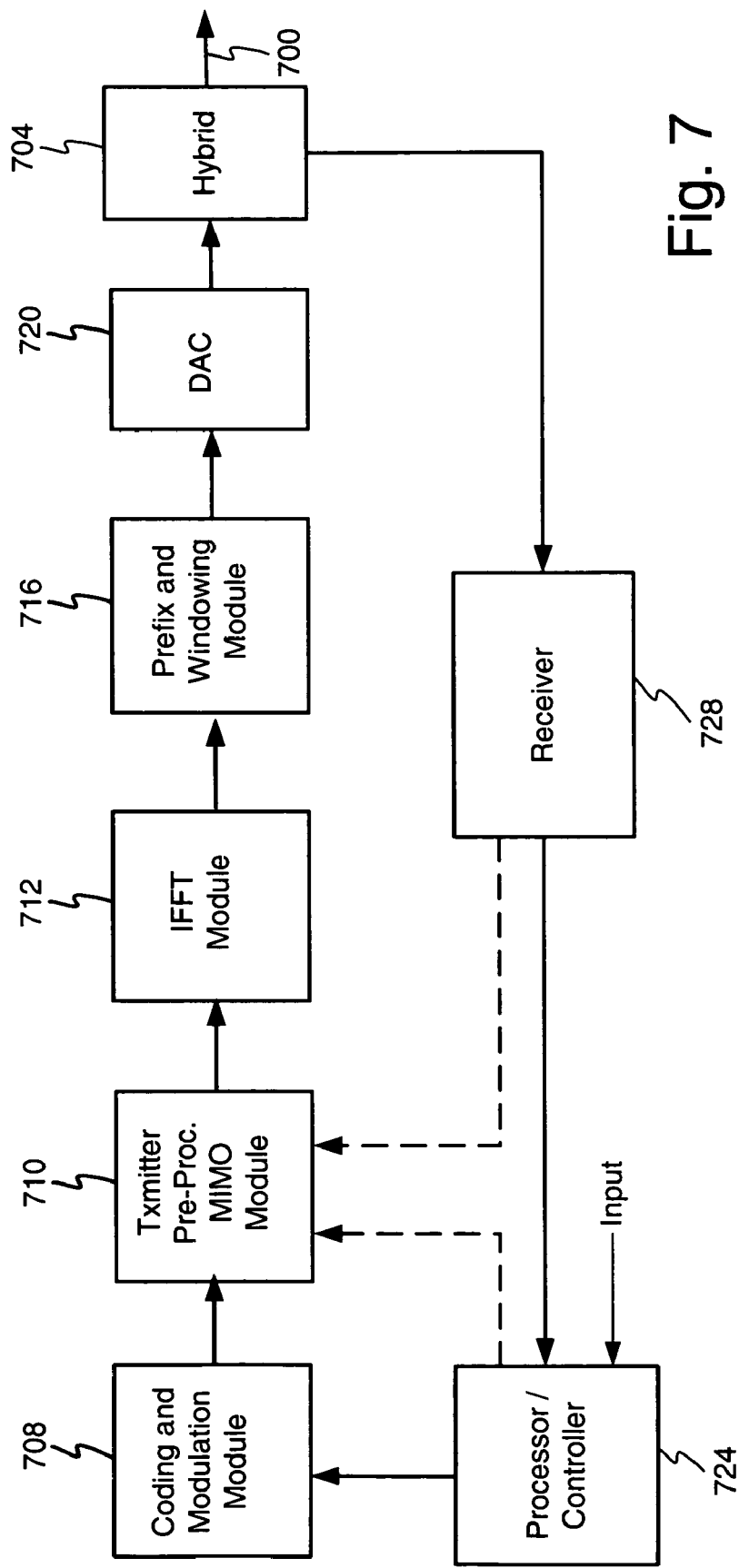
FIG. 7 illustrates a block diagram of a transceiver at a remote point location.

FIG. 7 illustrates a block diagram of an example transceiver and provides more details on the transmitter portions of the transceiver. This is but one possible example embodiment and, as such, it is provided for purposes of discussion and to aid in the understanding of the invention. It is contemplated that one of ordinary skill in the art may arrive at a different embodiment, or that the invention may apply to different environments, without departing from the scope of the claims. This example embodiment is in a DMT environment.

Although it is contemplated that the principles described herein may be utilized with any transmission standard, modulation scheme, or encoding scheme, in this example embodiment, a vectored DMT transmission system is adopted for use. The transmitter shown in FIG. 7 comprises a DMT transmission system in which a collection of all the signals to be transmitted from all the available channels are processed in sync, with synchronous clocks and frame aligned, through the DMT transmitter blocks as shown.

As stated above, the processing described herein may be utilized with any communication standard or scheme. Mitigation of intersymbol interference in a single channel (as well as multi-channel) systems may be accomplished by appropriate transmitter and receiver filtering (channel equalization).

As shown, an input from a network device, computer, switch, or any communication or source device is received at a processor or controller 724. The processor or controller 724 may also receive an input from a receiver 728. One or more outputs from the processor or controller 724 may connect to a coding and modulation module 708 if so equipped for processing in accordance with one or more coding and modulation schemes. The processor or controller 724 and/or the receiver 728 may also provide an output to a transmitter MIMO preprocessing module 710, which may also be referred to herein as a MIMO precoder.

In one embodiment, the coding and modulation comprise DMT type coding and modulation. U.S. Pat. No. 5,673,290, which is incorporated by reference, provides general information and background regarding DMT type communication transmitters and processing. In one embodiment, the output of the coding and modulation module 708 comprises a multi-channel path or signal comprising 256 values which are represented as a magnitude and phase and which at this stage in the processing may be in the frequency domain. As DMT type coding and modulation is generally understood by one of ordinary skill in the art, it will not be described in detail herein. It should be noted that the input to the coding and modulation module 708 may comprise a multi-conductor or multi-channel module and the number of channels associated therewith may be dependant upon the number of channels utilized for communication between remote locations and the particular design choices of the system designers. The input may also comprise a high speed serial input.

The output of the MIMO pre-processing module 710 feeds, in this embodiment, into the IFFT module 712 (inverse Fast Fourier Transform). The IFFT module 712 processes the incoming data by performing an inverse Fast Fourier Transform on the incoming data. The transformed data is in turn provided to a prefix and windowing module 716 that is configured to append potentially needed leading and trailing samples of a DMT symbol and other processed data. In one embodiment, this comprises time domain multiplication of each real sample by a real amplitude that is the window height. This allows for a smooth interconnection of the samples, which in turn may decrease decay time in the frequency domain. The output of the prefix and windowing module 716 is eventually received at one or more digital to analog converters (DAC) 720 that may be part of an analog module that transforms the data into one or more analog signals, which are to be transmitted over one or more channels 700. It is contemplated that part of the DAC 720 may include one or more output amplifiers which may be controlled to thereby control the transmit power level of a transmitted signal, such as a training signal.

Between the channel 700 and the DAC 720 is a hybrid 704 configured to separate or isolate incoming and outgoing signals. The hybrid 704 also connects to a receiver 728. It is contemplated that other or additional processing modules or systems may be included within the transmitter but which are not shown. It is also contemplated that the output channel 700 may comprise a plurality of channels, paths or conductors. As suggested above the channel 700 may comprise two or more twisted pair conductors.

It is contemplated that a transmitter structure similar to that shown in FIG. 7 may be provided at each multi-point location, however, without the MIMO pre-processing module 710, as explained earlier.

The processor or control 724 may be in communication with elements 708, 710, 720 728, or other devices, such as an output amplifier to thereby control power levels. In addition, it is contemplated that a communication device at a multi-point location may calculate and send filter settings, such as co-efficient values for the transmitter pre-processing module 710, to the system shown in FIG. 7 for uploading to the transmitter MIMO pre-processing module. In addition, power control signals, selected to control transmit power levels, may be sent from the multi-point location to the system shown in FIG. 7.

Figure 8:
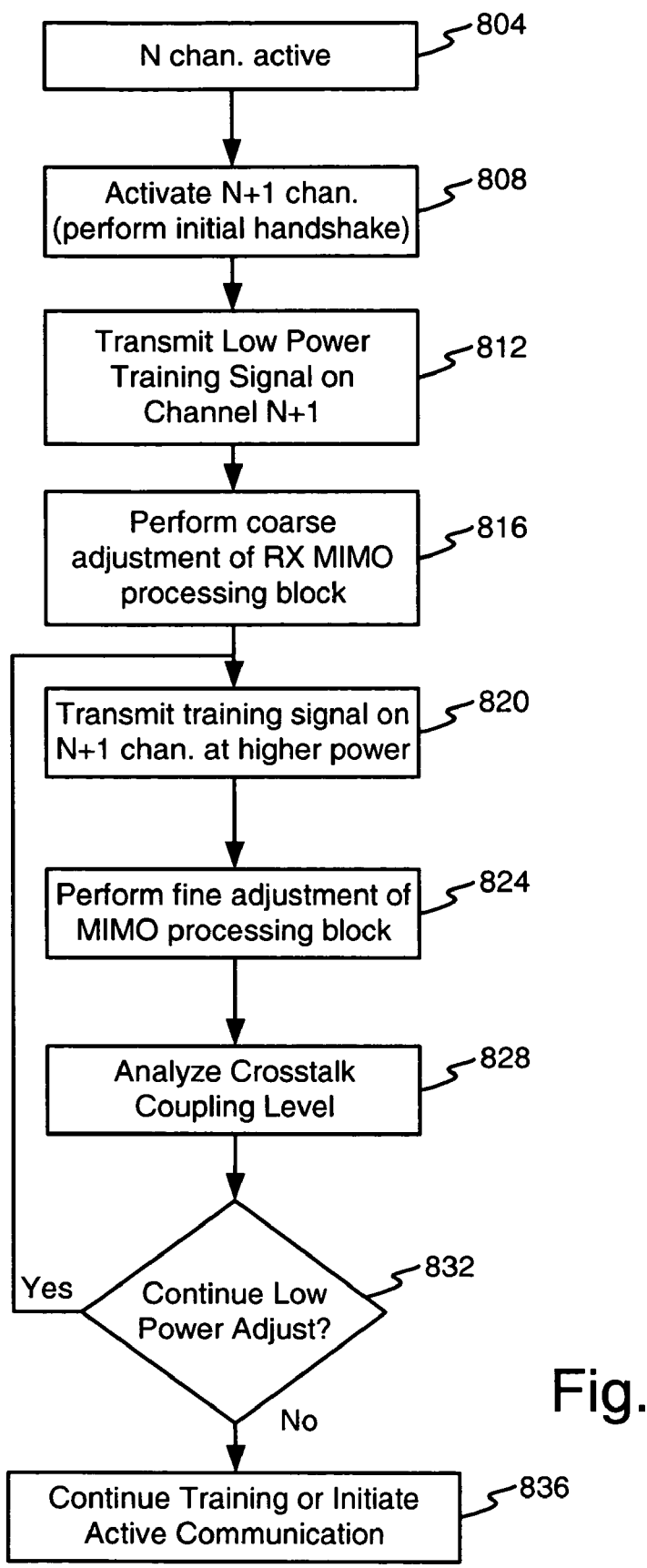
FIG. 8 illustrates an operational flow diagram of an example method of operation of new channel activation procedure for upstream transmission.

Operation, in accordance with one example method of operation, of the systems shown in FIG. 6 and FIG. 7 is explained next. FIG. 8 illustrates an operational flow diagram of an example method of operation of new channel activation procedure for upstream transmission. As used herein, the term upstream transmission refers to transmission from a multi-point location (i.e. CPE) to a point location (i.e. CO). This is but one example method of operation and hence, it is contemplated that other methods may exist. At a step 804, it is contemplated that the one or more other channels associated with a point location communication device are provisioned and are capable of being engaged in active communication. Likewise, it is contemplated that a MIMO processing module is trained to cancel crosstalk generated by these channels. At a step 808, the operation initiates provisioning and activation, such as with a training process, of channel N+1. In contrast to prior art methods which would utilize a full power transmit signal, the method of FIG. 8 transmits a low power training signal on channel N+1. This occurs at a step 812. Use of a low power signal for purposes of training or at other times, provides the benefit of not disrupting operation of the other active channels through unwanted crosstalk coupling. Use of a lower power signal reduces crosstalk interference because the low power levels generate lower electrical fields, which in turn radiate less interference into other channels.

At a step 816, the operation performs coarse adjustment of an inter-channel crosstalk reduction system. In one embodiment, this comprises performing coarse adjustment or establishment of one or more filter coefficients in a MIMO processing module. At a step 820, the operation increases the power level of the training signal to a power level higher than transmitted at step 812 the new power level may be at full or lower than full (or normal) transmit power. Thus, the power controlled training operation described herein may increase the transmit power level over one or more iterations or in one or more stages. The manner in which the power level of the training or other signal is increased, i.e. ramped up, may assume any form, such as, but not limited to, linearly or exponentially ramped or stair stepped.

It is further contemplated that at step 820, the amount of power level increase may be based on monitoring of the crosstalk or controlled in any manner. Thus, it is contemplated that there may be a crosstalk monitoring function linked to a power control system.

At a step 824, the operation performs fine adjustment on the interchannel processing system, such as for example, a MIMO processing module. It is contemplated that the fine adjustment more precisely tunes the coarsely adjusted filter values. Each adjustment or correction of the filter values reduces crosstalk by allowing the filter associated with the channel in training to generate a more accurate crosstalk cancellation signal. This can be appreciated best with reference to FIG. 5.

At a step 828, the operation may optionally analyze the amount of crosstalk to determine if additional filter training, at a lower than normal transmit power level, is required. In one embodiment, the amount of induced crosstalk may be compared to a threshold value. In one embodiment, the training and power control pattern may follow a pre-set pattern and in such an embodiment, this step may be bypassed. Alternatively, the process may be dynamic, as described above, such that the power control operates in unison with crosstalk detection.

At a decision step 832, the operation determines whether to continue the low power training session to further adjust the interchannel processing to reduce crosstalk or if training is sufficiently complete to allow for a full or normal power signal. In one embodiment, if at step 828, the level of crosstalk coupling generated by the activation of the new channel does not disrupt operation of the other active channels, than sufficient training has occurred with use of a lower power signal.

If at step 832, the decision step determines that additional training is necessary, with a lower than normal transmit power level, then the operation advances to step 820 and the operation occurs as described above. Alternatively, if at step 832, the decision step determines that the power level and filter training level is adequate to prevent disruption of other channels, the operation advances to step 836. At step 836, the operation continues additional training, but with a signal at a normal power level, and/or initiates active communication.

It is further contemplated that in a simplified embodiment, the process may adjust the training signal power at fixed and predetermined time instants and at fixed and predetermined step increments. In that case step 828 would be absent, and step 832 would simply represent a check on whether the predetermined number of iterations has been exhausted.

It should be appreciated that for the process of FIG. 8 to function properly, it may be required that both the transmitter and the receiver must be in agreement on the time instants that the power level change will occur as well as the amount of power level increase in each instant. In one embodiment, the receiver is in control of those decisions (arrived at in step 828), and subsequently communicates this information to the transmitter through a control channel. In another embodiment, those decisions are pre-agreed upon by the transmitter and receiver, and hence step 828 is absent and no information needs to be exchanged.

Figure 9:
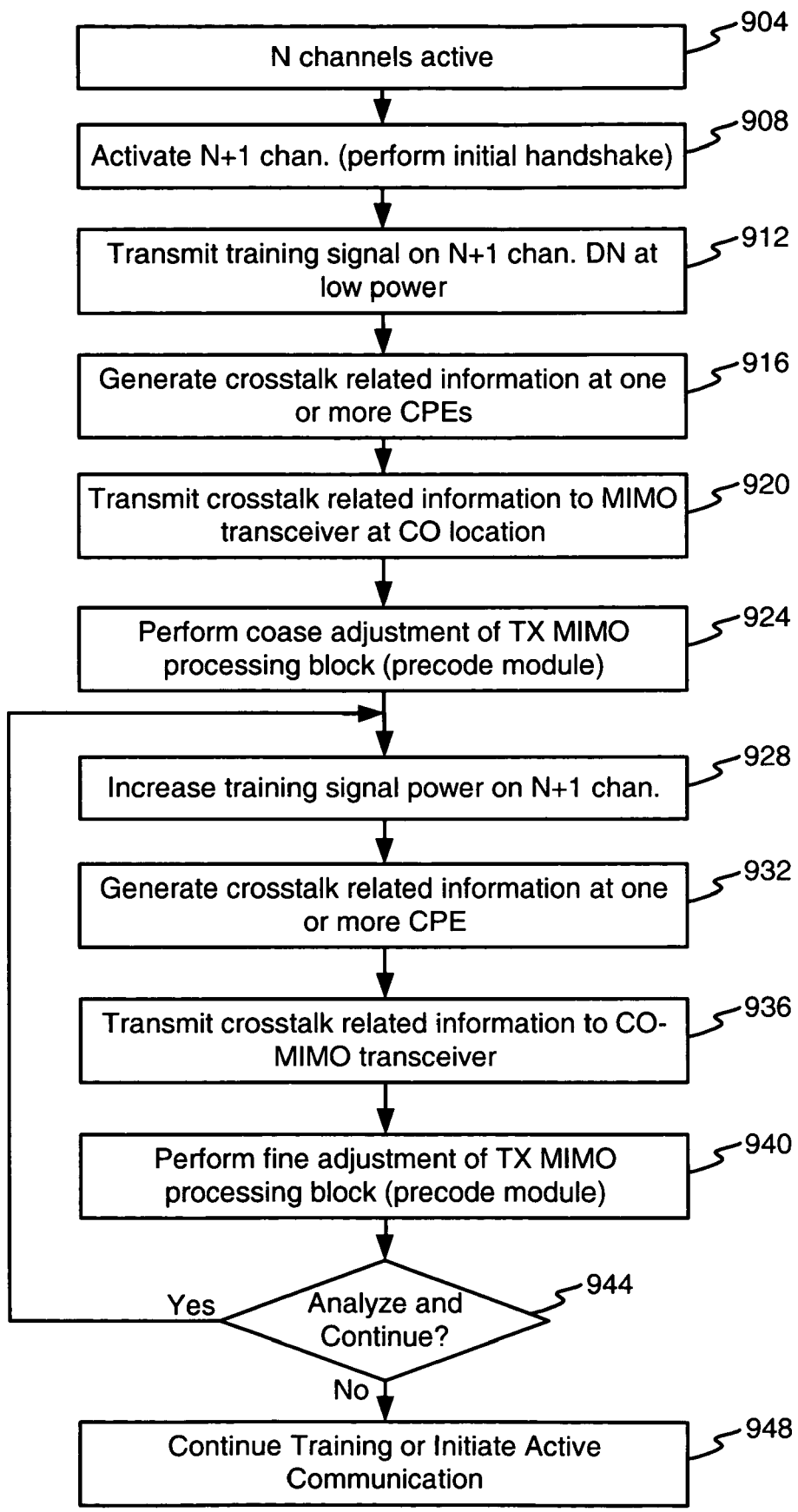
FIG. 9 illustrates an operational flow diagram of an example method of provisioning, activating and training of a new channel for downstream transmission.

FIG. 9 illustrates an operational flow diagram of an example method of provisioning, activation and training of a new channel for downstream transmission. The term downstream transmission is defined to mean transmission from the CO (point location) to the CPE (multi-point location). The terms CO and CPE are used herein for purposes of explanation and, as such, the method of FIGS. 8 and 9 should not be considered as being limited environments where a CPE or CO are in use. The method of FIGS. 8 and 9 may be utilized alone or in combination with other methods and may be used with communication elements other than traditional CPE and CO type systems. This is but one example method of operation and hence, it is contemplated that other methods may exist. At a step 904, it is contemplated that the one or more other channels associated with a communication device are provisioned and active, or are capable of being engaged in active communication. At a step 908, the operation initiates provisioning and activation, such as with a training process, of a new channel N+1. In contrast to prior art methods which would transmit a training or other type signal at full power, the method of FIG. 9 transmits a low power training signal on channel N+1. This occurs at a step 912. Use of a low power signal for purposes of training or at other times, provides the benefit of not disrupting operation on the other active channels through unwanted crosstalk coupling. Use of a lower power signal inhibits crosstalk coupling. This signal is transmitted from the CO to the CPE location.

The purpose of this training signal is to probe the crosstalk coupling channels, identify their coupling strengths and design appropriate cancellation filters all while not disturbing operation of the other active provisioned channels. In contrast to the upstream transmission case of FIG. 8, the design of MIMO cancellation filters in the downstream case faces one additional obstacle. Recall from FIG. 7 that in the downstream case the MIMO filters reside in the transmitter and perform MIMO pre-processing or pre-coding of the signals. Unfortunately, the transmitter has no immediate knowledge of the received signals at the CPE and hence is at a disadvantage at training those pre-processing filters. One proposed solution to this problem is to have the CPEs calculate the appropriate channel parameters from the received signals and communicate those parameters to the transmitter as explained below.

At a step 916, the operation generates crosstalk related information at one or more of the CPEs. In one embodiment, this crosstalk related information for CPE i, i=1, ..., N, comprises the response of the crosstalk channel coupling from the new source N+1 to the victim CPE i. This assumes that CPE i has knowledge of the training signal sent on channel N+1 and is capable of identifying the cross coupling channel response using appropriate signal processing algorithms. This identification will have to be performed without disruption of the transmission on channel i. In one embodiment, this crosstalk related information is utilized, as described below, to establish one or more coefficients or tap values for a precoder located at the CO. At a step 920, the crosstalk related information is sent to a MIMO capable transceiver located at the CO. In another embodiment, the training signal sent on channel N+1 is periodic and the receiver at CPE i, i=1, ..., N, calculates an averaged version of the received signal. Then, this averaged signal is transmitted to the CO side (step 920) where it is further processed and appropriate channel information extracted. It is contemplated that this information is sent over the channel and may be sent at a lower power or at a data rate that does not interfere with other active channels. At the CO, the crosstalk may optionally be further processed or utilized as received to configure a precoder type processing module that performs processing on a signal prior to transmission through the channel(s). It may be desirable for pre-coding to occur across two or more of the channels at the CO location because access to all the channels is only possible at the CO location in a point to multi-point communication system.

At a step 924, the MIMO processing module performs coarse adjustment of the transmitter MIMO processing module. The transmitter MIMO processing module is configured to precode or pre-cancel outgoing signals to thereby pre-cancel unwanted coupling or crosstalk that will occur across channels as the various signals are transmitted through the channels. Because access to all the signals is available at the CO location, MIMO pre-coding may occur at that location. Thus, at step 924, coarse adjustments are made to the precoding MIMO processing unit or module. The use of a low power training signal provides crosstalk data for the coarse adjustment without generating sufficient coupling into other channels to disrupt operation of active and provisioned channels.

At a step 928, the operation increases the training signal power level on channel N+1. The power level of the training signal may now be at full or normal power or at intermediate power level, such as, for example, a power level between the power level of the signal at step 912 and the normal power level. At step 932, the operation generates crosstalk related information at one or more of the communication devices at the CPE locations. This crosstalk information may be the same as or different than the crosstalk information described above.

At a step 936, the operation transmits the crosstalk related information from the CPE location to the CO location for use by the interchannel processing device, such as a precode MIMO system. Accordingly, at a step 940, the operation performs an adjustment of the precode MIMO system, if necessary. In one embodiment, this may be considered a fine tuning operation. Then, at step 944, a determination is made regarding whether additional iterations are required. If additional iterations are required, then the operation returns to step 928 and the power level of the transmit or training signal may or may not be increased and the precode filter coefficients may or may not be further adjusted to thereby provide for more accurate precoding of transmitted signals, which in turn reduces or counters crosstalk coupling that occurs during transmission of the new signal over the new channel which is being provisioned. It is contemplated that prior to transmission, the outgoing signals on the new channel and other channels, undergoes appropriate precoding.

If, at step 944, the operation determines that a sufficient number of iterations have occurred, then the operation advances to step 948. In one embodiment, an analysis of the level of crosstalk coupling may occur. This may further comprise comparison of the crosstalk to a threshold. At step 948, the operation may perform additional training or initiate active communication.

Also disclosed herein is a method and apparatus for precoding a signal transmitted from a communication system, located at a CO, to two or more different remote locations, referred to herein as CPE locations, or simply CPE. Also disclosed is a method and apparatus for training a precode MIMO filter during activation of a new channel to prevent unwanted crosstalk, generated during active operation of the new channel, from disrupting signals on other channels that are also processed through the precode MIMO filter.

Figure 10:
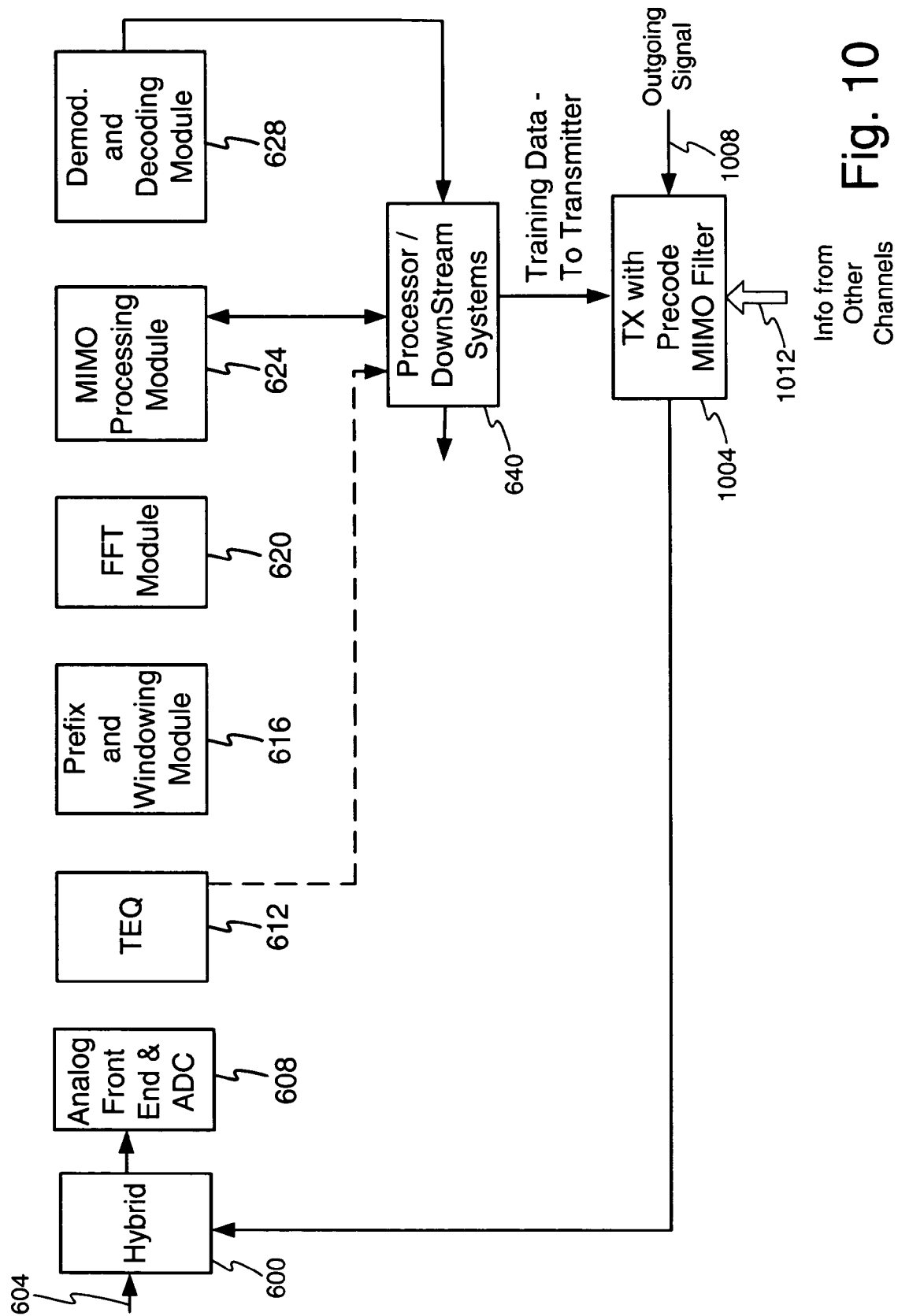
FIG. 10 illustrates a block diagram of a CO communication device configured with a precode MIMO filter in the transmitter.

FIG. 10 illustrates a block diagram of a CO communication device configured with a precode MIMO filter in the transmitter. FIG. 10 is generally similar to FIG. 6 and, as such, only the aspects of FIG. 10, which differ from FIG. 6, are described below. In one embodiment, MIMO preceding is done before the FFT and is described in block (710) in FIG. 7. The embodiment of FIG. 10 further comprises a transmitter module 1004 configured with a precode MIMO filter. This precode MIMO filter is also depicted in the detailed transmitter block diagram of FIG. 7 as block 710. An input 1008 provides an outgoing signal to the transmitter 1004 equipped with the precode MIMO filter. One or more filter coefficients may be provided to the transmitter 1004 from the processor 640 or the precode MIMO filter may calculate the coefficients internally using any known or discovered filter coefficient calculation method.

An input 1012 may optionally be included to provide information from other channels, such as, but not limited to, the signal that is being output on the other active channels. This may occur so that the precode MIMO filter equipped transmitter 1004 may process these signal(s) and the outgoing signal received on input 1008 prior to transmission to pre-cancel unwanted coupling or noise that will result from the transmission of the outgoing signal on a channel that is in proximity with the other active channels. It is contemplated that this apparatus and process may exist and occur in each transmitter. Alternatively, a common precode MIMO filter may be shared by all the channels to thereby provide a common and shared structure to perform the precode MIMO processing.

The MIMO preceding block 1004 resides in the transmitter and provides performance improvements in the "transmit" direction of communication. The MIMO processing block 624 resides in the receiver and provides performance improvements in the "receive" direction of communication. A particular embodiment may comprise one or the other or both MIMO blocks.

Figure 11:
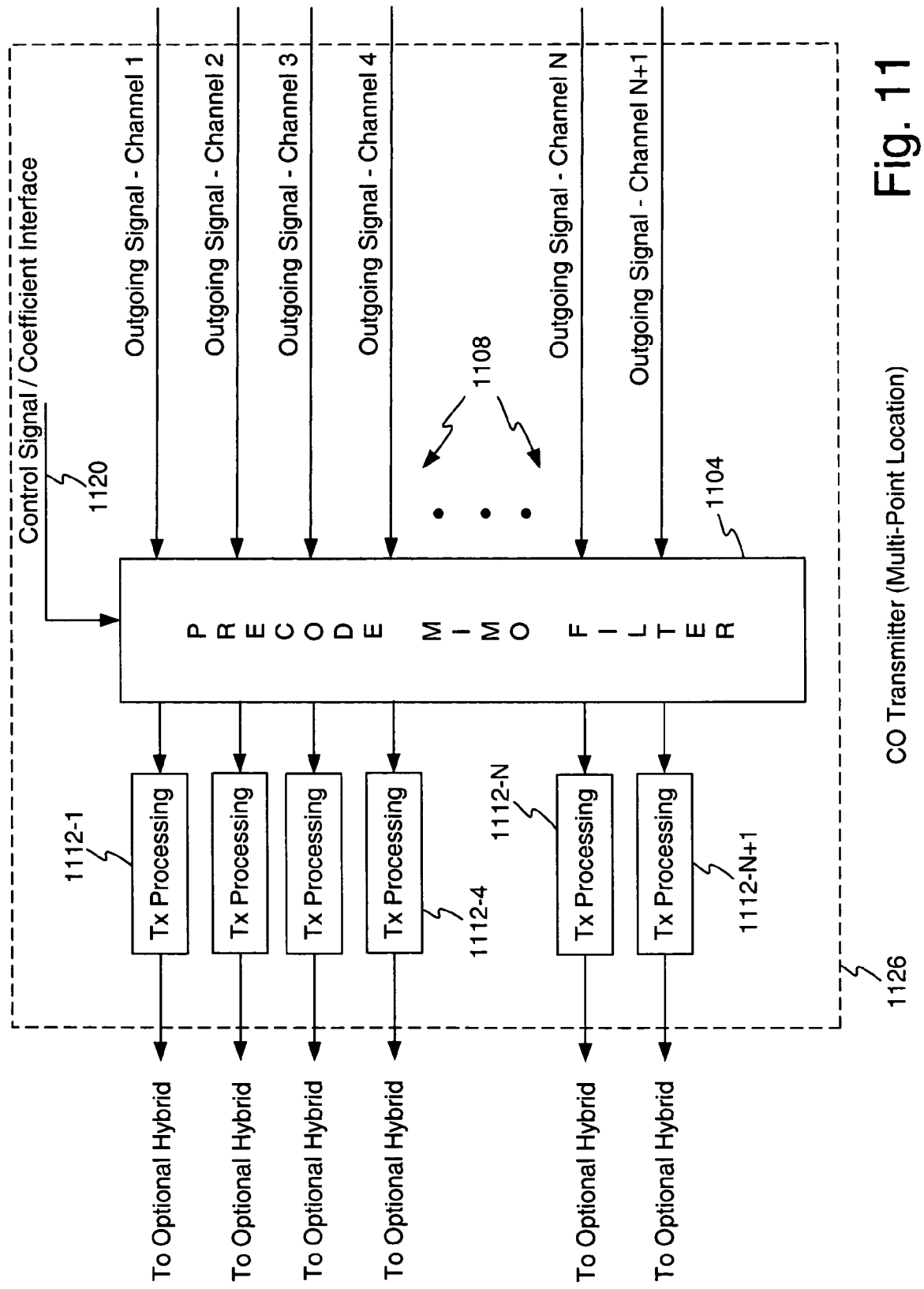
FIG. 11 illustrates a block diagram of an exemplary precode MIMO filter such as may be utilized to process the outgoing signals on the active channels and a channel being activated when appropriate.

FIG. 11 illustrates a block diagram of an exemplary precode MIMO filter such as may be utilized to process the outgoing signals on the active channels and a channel being activated when appropriate. This is but one possible example embodiment and, as such, it is contemplated that other embodiments may be created without departing from the claims that follow. As shown, two or more signal paths, namely channels 1 through N+1 1108 are configured to carrying two or more outgoing signals connect. Process may occur on the signals on these channels prior to the signals being provided to a MIMO precode filter 1104 that is configured to process the outgoing signals to pre-cancel unwanted coupling, noise, or both, prior to transmission to the signals from the CO, i.e. point location, to the two or more CPEs, i.e. remote multi-point locations.

In a point to multi-point communication system only the CO, i.e. point location, has access to all of the channels and thus, the signals on these channels. As a result, precode MIMO processing prior to transmission is one potential solution to pre-cancel coupling that will or may occur during transmission of the signals. Operation and configuration of a multiple input filter 1104 is described in more detail in application Ser. No. 10/658,117, titled Decision Feedback Transceiver for Multi-Channel Communication System, filed Sep. 8, 2003 and application Ser. No. 10/717,702, titled Multi-Channel Communication System for Multiple Input, Multiple Output Processing of an Encoded Signal, filed Nov. 19, 2003, both of which are incorporated herein by reference.

An input 1120 connects to the precode MIMO filter and may be configured to provide a user interface to the MIMO filter or provide filter coefficients to the filter. The filter coefficients may be calculated in a processor, another filter, or alternatively, in the precode MIMO filter 1104 itself.

The output of one or more channels of the filter 1104 is output to one or more transmit processing modules 1112-1 through 1112-N+1, each of which may be configured identically or differently. The transmit processing modules 1112 may perform any type processing on the outgoing signal, such as, but not limited to, the blocks 712, 716, 720, indicated in FIG. 7, for the example of a DMT modulated signal. The output of the transmit processing modules 1112 may be connected directly to a channel, or to a hybrid, not shown in FIG. 11. The precode MIMO filter 1104 may be located within a transmitter as shown by dashed line 1126, or as a separate element of the CO communication transceiver.

During operation, the two or more signals provided to the MIMO filter 1104 are processed or modified based on the coefficient values of the MIMO filter to thereby pre-cancel the unwanted coupling that will occur across channels. As an advantage to the use of the MIMO filter 1104 as described herein, all the signals on all of the channels that connect to the filter are available for processing at the CO. As such, a cancellation signal may be created for one or more channels based on the signals, one or more coefficient values, and any other factor. If configured to occur across all active channels, i.e. all channels that are provisioned, active, and transmitting data, then all the signals may be utilized and processed to generate a precoded signal that after transmission appears as if crosstalk coupling did not occur. Absent such processing, unwanted crosstalk would disrupt operation and potentially prevent communication on one or more of the active channels, increase BER, and reduce the effective data rate.

As can be appreciated after discussion of the system of FIG. 11, when a new channel, such as for example, channel N+1, is to be changed from an inactive status to an activate status, the resulting crosstalk from this new signal on the channel being activated can disrupt operation of the already active channels because the precode MIMO filter is not yet trained to pre-cancel the crosstalk that will be created by the activation of this new channel N+1. The following method for training, which may be implemented using the embodiment described above or any other embodiment, allows for training of a channel being activated without disrupting operation of the other active channels.

Figure 12A:
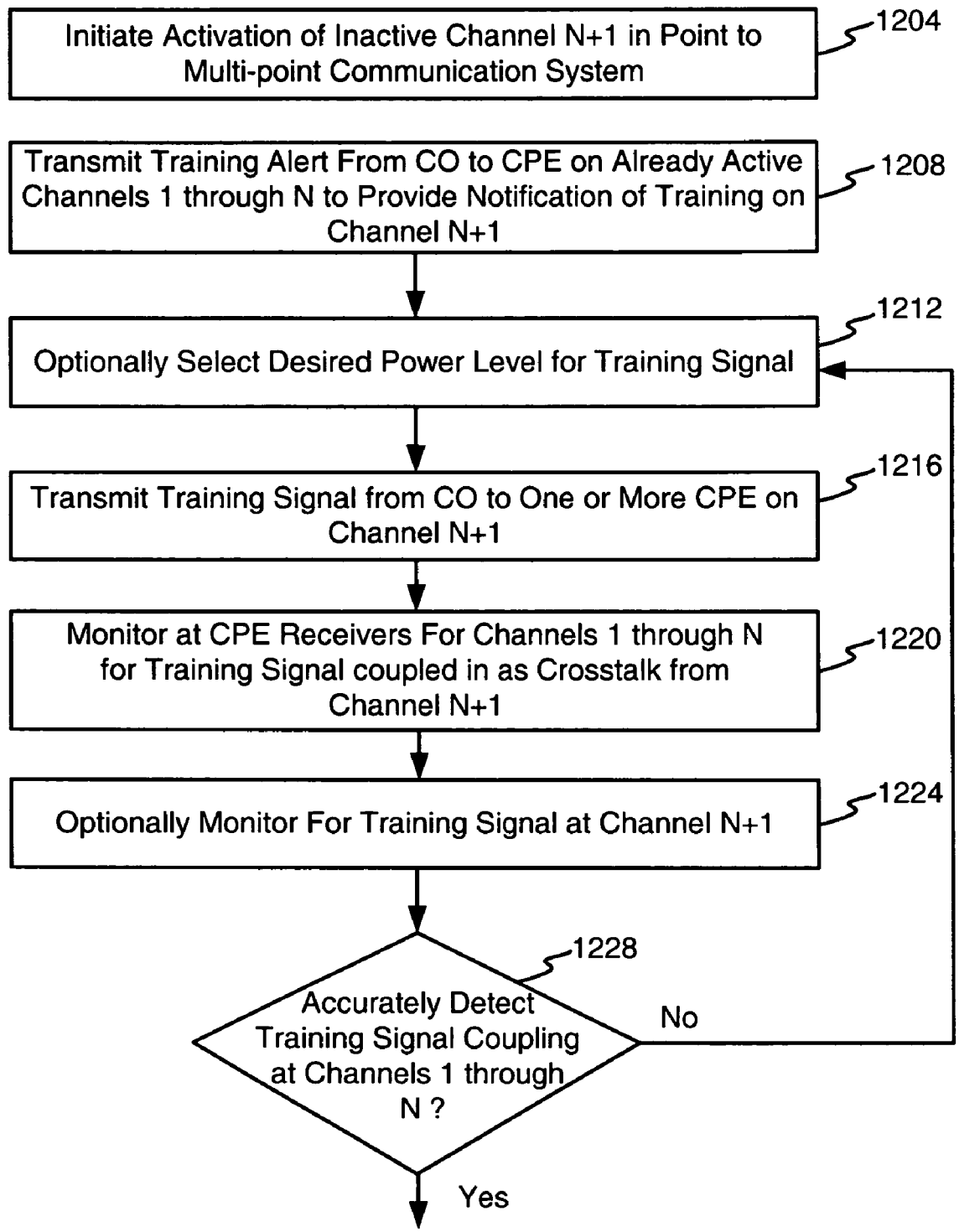
FIGS. 12A and 12B illustrate an operational flow diagram of an example method of training a precode MIMO filter in a point to multi-point communication system.
Figure 12B:
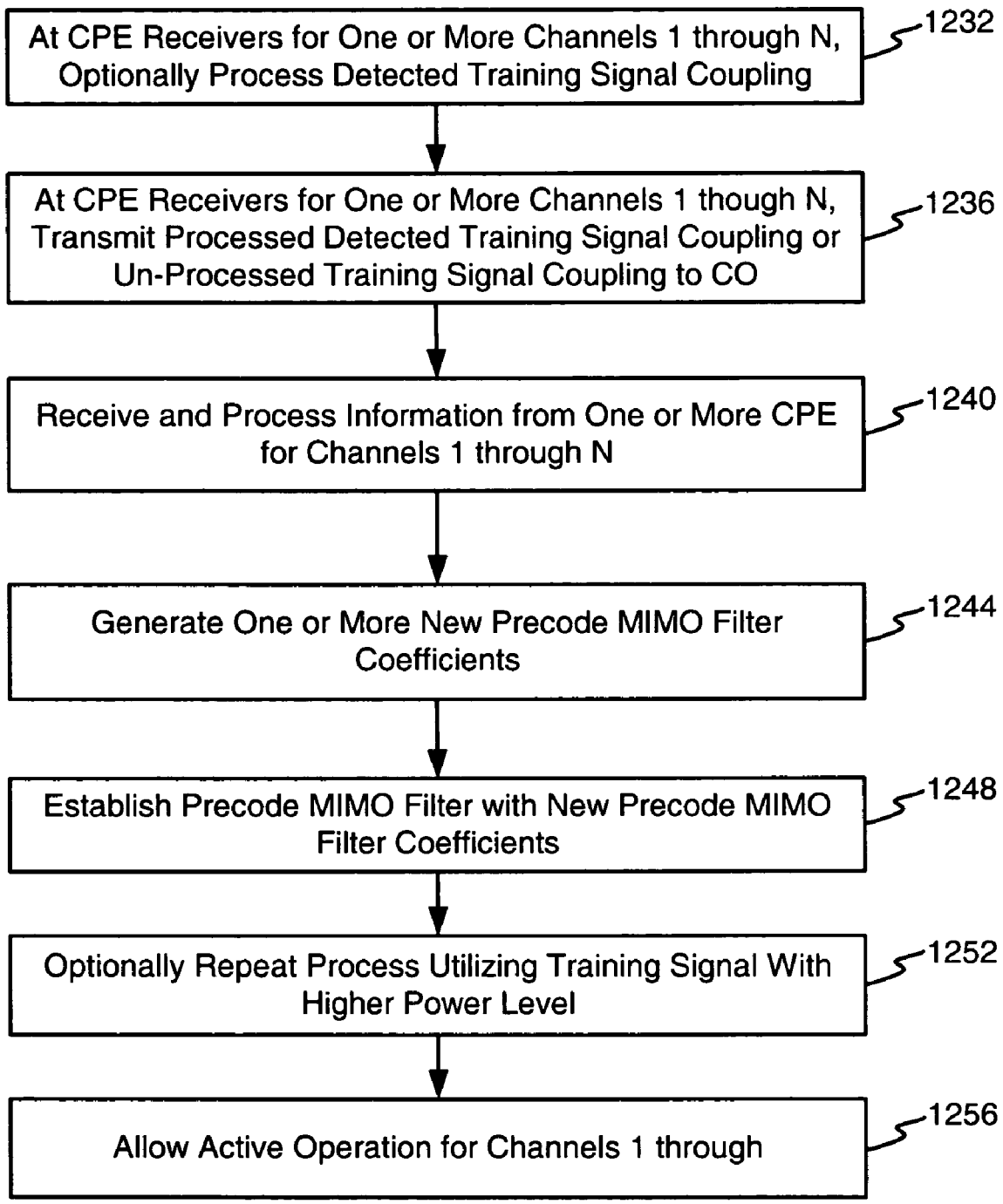

FIGS. 12A and 12B illustrate an operational flow diagram of an example method of training a precode MIMO filter in a point to multi-point communication system. While in FIG. 9 the adaptation of power levels of the new line during training was described, FIGS. 12A and 12B further specify the behavior of the remaining active lines 1, . . . , N throughout this process. As would be understood by one of ordinary skill in the art, this is but one example embodiment and, as such, other methods of training may be enabled that differ from this example embodiment, but which are covered by the claims that follow. During the description of these figures, the term CO is used to designate a central office or a point location. However, the term CO should be interpreted to mean locations other or in addition to traditional telephone central office locations. The term CPE is used to designate a customer premise location or a remote multi-point location, however, locations other than traditional CPE locations should be considered as being encompassed by the term CPE. To aid in understanding and in reference to FIG. 3, elements 308 may be considered CO locations while elements 320 may be considered CPE locations.

Turning now to FIG. 12A, at a step 1204, a process is initiated to activate a new channel, in this embodiment channel N+1, in a point to multi-point communication system. As part of the training process to establish at least one new precode MIMO filter coefficient, a training alert may optionally be sent, at a step 1208, from the CO location to one or more active CPE locations to provide notification that a training signal is to be sent on channel N+1, which is undergoing activation. Transmission of the training alert signal is an optional step utilized to notify the receivers of the CPE locations that a training signal is to be transmitted on a channel undergoing activation and, as such, the CPE receivers should monitor for crosstalk, interference, or both that couples into the active channel associated with the CPE due to the transmission of the training signal. It is contemplated that the CPE receivers associated with the active channels may always be in a monitoring mode for coupling from new channels and thus, this process may occur during data mode on the active channels with or without the training alert signal.

At a step 1212, the operation optionally selects a power level for the training signal. The power level of the training signal may comprise a training at full signal power, which is defined as the power level of a signal on an active channel, or at a power level that is less than full power. As described above in more detail, use of a training signal at a power level below that of an active channel signal will introduce less coupling into signals on the other channels, which in turn reduces the likelihood of disrupting operation of those other channels. After the precode MIMO filter is trained, a signal at full power may be utilized on the channel undergoing activation.

Thereafter, at a step 1216, the operation transmits a training signal, on channel N+1, from the CO to the one or more CPE locations. This training signal may serve numerous purposes, such as, for example, to train the receiver filters and equalizers in the newly activated line N+1. In the context of MIMO systems, this training signal is also very useful for the CPE receivers of active lines 1, . . . , N in order to identify the cross-coupling transfer function between line N+1 and each of the lines 1, . . . , N. This signal can be either a periodic training signal or a pseudo-random training signal as is common practice and well understood to those trained in the art. Accordingly, at a step 1220, the receivers or other apparatus at the active channel CPEs monitor and identify the coupling introduced by the training signal. If the training signal is periodic, then identification of the coupling transfer function can be achieved by synchronous averaging of the received signal over a large number of signal periods (thus reducing the effects of noise) or by other means. If the training signal is pseudo-random, then other on line or batch cross-correlation techniques may be used like the Least Mean Square or other adaptive algorithms. The above averaging or adaptive methods may optionally be applied to the received signal at CPE locations 1, . . . , N after the data carrying signal on those lines has been removed. In this way, the cross-coupling signal from line N+1 will be more prominent and easier to identify. It is contemplated that the amount of coupling may be dependant on numerous factors including, but not limited to, the power level of the training signal. Responsive to the monitoring and identification, at a decision step 1228, the operation determines whether the coupling was accurately and sufficiently detected and estimated on the active channels 1-N by the CPE. Alternatively, in a simplified implementation, a fixed amount of training/estimation time is allotted and each CPE must complete the monitoring and estimation phase within this pre-determined time frame. In that case step 1228 becomes optional. It may take numerous iterations of training signal transmission at various power levels for the receiver apparatus to estimate the coupling introduced onto the active channels by the training signal and, as a result, the operation may return to step 1212 to repeat this process.

If the training signal coupling is adequately detected, then the operation advances to a step 1232, as shown in FIG. 12B. At step 1232, the CPE apparatus, such as, for example, the CPE receiver for the active channels may optionally further process the detected training signal coupling that was detected previously. To reduce complexity of the CPE receiver, the further processing may occur at the CO device. At a step 1236, the CPE transmits, on the active channels, the detected coupling or information regarding the detected coupling. The information regarding the detected coupling may comprise processed or unprocessed coupling signal or information. It is contemplated that this transmission may optionally occur during active data communication on the active channels and, as such, any side channel or data insertion scheme may be utilized.

At a step 1240, the CO location, i.e. point location, receives and processes this data on the active channels 1 through N that are transmitting as defined in step 1236. Processing of this data may optionally occur as part of step 1244 to thereby generate or modify the one or more coefficients of the precode MIMO filter. Any method of filter coefficient calculation may be utilized to generate the desired coefficients. At a step 1248, the operation establishes the precode MIMO filter with the new or modified filter coefficients. These new or modified coefficients are configured to cancel coupling from not only all the previously active channels, but also the newly activated channel.

Absent this training, the precode MIMO filter was not trained and configured to cancel the coupling from the newly active channel. As such, without such training across all channels, transmission of data on the newly active channel would disrupt operation of the active channels.

At a step 1252, the operation may optionally repeat, to more accurately define the coefficient values, such as, with a high power level training signal. For example, the training signal may move from a first power level to a second power level, such that the second power level may be at the same power level as an active signal or at power level between an active signal and the first power level. At a step 1256, after the training process, active operation may occur on the newly activated channel after precode MIMO filter training. Thus, active communication may occur on channels 1 through N+1 and the MIMO precode filter is trained to pre-cancel coupling that will occur across all active channels, including the newly active channel.

While various embodiments of the invention have been described, it will be apparent to those of ordinary skill in the art that many more embodiments and implementations are possible that are within the scope of this invention.

What is claimed is:

1. A method for establishing or updating filter coefficients in a MIMO precode filter during activation of a new channel, the method comprising:
    sending a training alert signal from a CO transmitter to one or more CPE receivers associated with active channels;
    transmitting a training signal from the CO transmitter to a CPE receiver associated with the channel being activated;
    monitoring, with one or more CPE receivers associated with active channels, for noise, coupling or both generated by transmission of the training signal;
    isolating noise, coupling, or both generated by the training signal and received at the CPE receivers associated with active channels;
    transmitting the noise, coupling, or both or information regarding the noise, coupling, or both from the CPE associated with the active channels to the CO;
    processing the noise, coupling, or both or information regarding the noise, coupling, or both at the CO to establish MIMO precode filter coefficients configured to pre-cancel noise, coupling, or both resulting from signals on the channel being activated.

2. The method of claim 1, wherein noise, coupling, or both couples into the active lines due to transmission of a signal on the channel being activated.

3. The method of claim 1, wherein the CO transmitter has access to channels 1 through N+1 and a CPE has access to only one channel thereby preventing MIMO processing at the one or more CPEs.

4. The method of claim 1, wherein isolating noise, coupling, or both is performed by a processor.

5. The method of claim 1, wherein the training signal is at a power level that is lower than a signal transmitted on an active channel.

6. The method of claim 5, further comprising repeating the method of claim 1 utilizing a training signal that is at a power level generally similar to the power level of a signal on an active channel to thereby establish the MIMO precode filters coefficients in stages to reduce the chances of disrupting operation of an active channel.

7. A method for activating a channel in a point to multi-point communication system comprising:
    monitoring for coupling from a training signal at one or more CPE locations;
    detecting coupling onto one or more active channels at one or more CPEs associated with active channels;
    transmitting coupling information to a CO;
    modifying one or more precode MIMO filter coefficients based on the coupling information.

8. The method of claim 7, further comprising transmitting a training alert signal from the CO to one or more CPE locations associated with an active channel to initiate the monitoring.

9. The method of claim 7, wherein the training signal is transmitted at least once at a power level that is less than a power associated with a signal transmitted on an active channel.

10. The method of claim 7, wherein the precode MIMO filter comprises a filter, having one or more coefficients, located in the CO transmitter and configured to process one or more outgoing signals to pre-cancel crosstalk during operation of the communication.

11. The method of claim 7, wherein the training signal may be transmitted from the CPE location to the CO or from the CO to a CPE location.

12. The method of claim 7, wherein the training signal may comprise a known training signal or active data on a channel undergoing activation.

13. A method for activating a channel in a point to multi-point communication system comprising:
    transmitting a training signal alert from a CO to one or more active CPEs associated with active channels;
    transmitting a training signal or data on a channel being activated;
    receiving coupling information from one or more CPEs associated with active channels, wherein the coupling information comprising information regarding coupling from the training signal or data that couples into the active channels from the channel being activated;
    processing the coupling information to generate one or more filter coefficients; and
    establishing a precode MIMO filter with the one or more filter coefficients.

14. The method of claim 13, wherein the training alert signal notifies a CPE associated with active channels to monitor for coupling from a training signal or data on the channel being activated.

15. The method of claim 13, wherein the precode MIMO filter is located in the CO and configured to pre-cancel coupling between active channels.

16. The method of claim 13, wherein the transmitting a training signal comprises transmitting a training signal at a first power level during a first training stage and transmitting the training signal at a second power level during a second training stage.

17. The method of claim 13, wherein the processing occurs at the CO.

18. The method of claim 13, wherein the transmitting the training signal occurs multiple times to allow multiple opportunities for the CPE to detect the coupling from the training signal.

19. A communication device configured to communicate with two or more CPEs as part of a point to multi-point communication system and configured to perform precode MIMO filtering on outgoing signals transmitted from a point location to multiple remote locations, the device comprising:
- at least one transmitter configured to transmit a training signal to a CPE associated with a channel being activated;
- a receiver configured to receive coupling information from one or more CPE associated with an active channel;
- a precode MIMO filter configured to
  generate or receive one or more new filter coefficients based on the coupling information;
  process one or more outgoing signals with the one or more new filter coefficients,
- wherein the new filter coefficients also account for coupling from the channel being activated.

20. The device of claim 19, wherein the transmitter is further configured to transmit a training alert signal to one or more CPEs.

21. The device of claim 19, wherein the training signal is transmitted at a power level that is less than the power level utilized on an active channel to reduce the chance of the training signal disrupting operation of an active channel.

22. The device of claim 19, wherein the precode MIMO filter processes all the signals on all of the active channels and channels being activated.

23. The device of claim 19, further comprising a processor configured to calculate the one or more new filter coefficients.

* * * * *